Patented June 23, 1931

1,811,029

UNITED STATES PATENT OFFICE

MAXIMILIAN PAUL SCHMIDT AND WALTER SPIETSCHKA, OF WIESBADEN-BIEBRICH, GERMANY, ASSIGNORS TO KALLE & CO., AKTIENGESELLSCHAFT, OF WIESBADEN-BIEBRICH, GERMANY

PROCESS OF PREPARING LIGHT-SENSITIVE LAYERS BY MEANS OF DIAZO COMPOUNDS AND THE PRODUCTS OBTAINABLE THEREBY

No Drawing. Application filed November 30, 1928, Serial No. 322,959, and in Germany December 10, 1927.

The present invention relates to a process of preparing light-sensitive layers by means of diazo compounds and the products obtainable thereby.

It is known that diazo compounds are suitable for the preparation of negative and positive photographic pictures. Among these diazo compounds there are particularly useful for this purpose those of the aminophenols and aminonaphthols owing to their great stability and light-sensitiveness. For the negative-process especially diazo-salicylic acids and the diazo compounds of the aminonaphthols have been proposed. In U. S. Patent No. 1,444,469 filed September 12, 1922, in the names of Gustav Koegel and Heinrich Neuenhaus, are mentioned as such diazo compounds those of the 1.2- or 2.1-amino-oxy-naphthalenes or derivatives thereof.

We have now found that excellent pictures with many contrasting effects of a dark tint are obtained by using for the preparation of light-sensitive layers the diazo compounds of aminonaphthol-carboxylic acids on any base.

The aminonaphthol-carboxylic acids may be applied in a feebly acid, neutral or alkaline solution on the base such as for instance paper, cellulose film of the like.

If negative pictures are to be obtained the paper over which is spread an acid solution is brought for a short time into ammonia-vapor before exposing it to light. Paper treated in this manner then gives after it has been exposed to light under a print, just as papers, treated with neutral or alkaline solutions of the diazonaphthol-carboxylic acids, dark deep-violet to bluish-black pictures, the tint and stability of which still may be improved by the addition of metal salts to the layer or by an after-treatment with metal-salt solutions. But even the pictures which only have been washed are distinguished by a good fastness to light.

Furthermore, as already known, there may be added to the light-sensitive layer colloids such as, for instance, gelatin or a stabilizing agent capable of increasing the stability such as naphthalene-trisulfo acid, toluene-sulfo acid, boric acid, tartaric acid, trisodium phosphate, thiosulfate or the like.

Examples

1. A solution of 1.6 parts by weight of 1-diazo-2-hydroxy-3-naphthoic acid and 20 parts by volume of diluted sodium hydrate solution is spread on paper or on a film or these materials soaked therewith and then dried. Afterwards the paper is exposed to light under a negative and, after the positive picture has become well visible, it is washed with water. Thus a bluish-black picture is obtained on a perfectly white ground which by an aftertreatment with metal-salts may obtain various tones.

2. A solution of 4 parts by weight of 1-diazo-2-hydroxy-6-naphthoic acid in 50 parts by volume of diluted sodium hydrate solution is spread on paper which is then dried. On exposing the paper to light under a negative, a positive picture is obtained, which, after being treated with water, becomes olive-green on a pure-white ground.

3. Paper, covered with a hardened gelatin-layer, is treated with a solution of 2 parts by weight of the sodium salt of 1-diazo-2-hydroxy-3-naphthoic acid in 100 parts by volume of water then exposed to light under a negative, watered and after-treated with a copper salt. In this manner a black picture is obtained.

4. A solution of 2 parts by weight of trisodium phosphate, 4 parts by weight of 1-diazo-2-hydroxy-3-naphthoic acid and a quantity of sodium hydrate solution, sufficient for obtaining a clear solution, in 50 parts by volume of water are spread on paper which is then dried. After exposure to light under a negative and washing out bluish-black pictures on a perfectly white ground are obtained.

5. 4 parts by weight of 1-diazo-2-hydroxy-3-naphthoic acid and 2 parts by weight of trisodium phosphate are dissolved in 25 parts by volume of a diluted sodium hydrate solution and mixed with a solution of 1.2 parts by weight of boric acid and 0.3 parts by weight of tartaric acid in 25 parts by volume of water. The paper prepared with this solution in the usual manner gives bluish-black pictures on a very pure-white ground.

We claim:

1. The process of preparing light-sensitive layers which consists in applying on a suitable base diazo compounds of aminonaphthol-carboxylic acids.

2. The process of preparing light-sensitive layers which consists in applying on a suitable base diazo compounds of the 1-amino-2-hydroxy-3-naphthoic acid.

3. The process of preparing light-sensitive layers which consists in applying on a suitable base a mixture of the diazo compound of 1-amino-2-hydroxy-3-naphthoic acid and boric acid.

4. The process of preparing light-sensitive layers which consists in applying on a suitable base a mixture of the diazo compound of 1-amino-2-hydroxy-3-naphthoic acid, boric acid, and tartaric acid dissolved by means of an alkali.

5. The process of preparing light-sensitive layers which consists in applying on a suitable base a mixture of the diazo compound of 1-amino-2-hydroxy-3-naphthoic acid, boric acid, tartaric acid, and trisodium phosphate dissolved by means of an alkali.

6. As new products, light-sensitive layers on a suitable base containing diazo compounds of amino-naphthol-carboxylic acids.

7. As new products, light-sensitive layers on a suitable base containing an easily soluble salt of a diazo compound of an amino-naphthol-carboxylic acid.

8. As new products, light-sensitive layers on a suitable base containing an easily soluble salt of a diazo compound of the 1-amino-2-hydroxy-3-naphthoic acid.

9. As new products, light-sensitve layers on a suitable base containing an alkali salt of the 1-amino-2-hydroxy-3-naphthoic acid.

In testimony whereof, we affix our signatures.

MAXIMILIAN PAUL SCHMIDT.
WALTER SPIETSCHKA.